United States Patent
Segal et al.

(10) Patent No.: US 7,366,513 B2
(45) Date of Patent: Apr. 29, 2008

(54) METHOD AND APPARATUS FOR ROUTING ON HOLD CALLS

(75) Inventors: Niranjan N. Segal, Arlington, TX (US); Jheroen P. Dorenbosch, Paradise, TX (US); Anatoly S. Belkin, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 20 days.

(21) Appl. No.: 10/725,661

(22) Filed: Dec. 2, 2003

(65) Prior Publication Data

US 2005/0119005 A1 Jun. 2, 2005

(51) Int. Cl.
*H04Q 7/20* (2006.01)
(52) U.S. Cl. .................. 455/436; 455/445; 455/417
(58) Field of Classification Search ........... 455/416, 455/417, 426.1, 437, 461, 462; 379/266.01, 379/266.02, 266.03, 266.04
See application file for complete search history.

(56) References Cited

U.S. PATENT DOCUMENTS

| | | | | |
|---|---|---|---|---|
| 5,913,166 A | * | 6/1999 | Buttitta et al. ........... 455/553.1 |
| 6,138,030 A | * | 10/2000 | Coombes et al. ........... 455/518 |
| 6,633,635 B2 | * | 10/2003 | Kung et al. ............ 379/215.01 |
| 2003/0007625 A1 | * | 1/2003 | Pines et al. ................. 379/223 |
| 2003/0134638 A1 | * | 7/2003 | Sundar et al. .............. 455/435 |
| 2003/0154400 A1 | * | 8/2003 | Pirttimaa et al. ........... 713/201 |

OTHER PUBLICATIONS

R. Mahy, Internet Engineering Task Force, Internet Draft: "Using SIP for Peer-to-Peer Third Party Call Control," Nov. 2000. (Document: draft-mahy-sip-peer-3pcc-00.txt).*
M. Handley, et al. RFC 2543, "SIP: Session Initiation Protocol."*

* cited by examiner

*Primary Examiner*—Jean Gelin

(57) ABSTRACT

A wireless communication unit (101, 200), network switch (112, 300) and corresponding methods facilitate retrieval, routing, and management of on-hold calls (FIG. 5) within a first communication network (103) when the unit is operating in a second communication network (105) that is loosely coupled to the first. The communication unit comprises a transceiver (203) configured to support an air interface with the first and the second communication network; and a controller (209) arranged to cooperatively operate with the transceiver to retrieve an on-hold call from the first network via a call leg established to handout on-hold calls to and while the unit is operating in the second network. A user interface (211) facilitates management, connecting, disconnecting, etc., of the on-hold calls by the communication unit.

28 Claims, 4 Drawing Sheets

METHOD AND APPARATUS FOR ROUTING ON HOLD CALLS

FIELD OF THE INVENTION

The present invention relates in general to communication units and networks, and more specifically to methods and apparatus to facilitate on hold call retrieval and routing for communication units operating within such networks.

BACKGROUND OF THE INVENTION

Wireless Local Area Networks (WLANs) are being contemplated or are known. Voice services in WLANs are typically supported by WLAN servers that may be referred to as private branch exchanges (PBXs) or enterprise servers. The PBX normally provides a control and switching function for the WLAN and communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs), such as conventional cellular telephone systems, are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. In situations, sometimes referred to as loosely coupled systems, where the WAN is indirectly coupled to the WLAN via the public switched telephone network (PSTN) or communication unit operating thereon this can present problems, particularly for on-hold calls within the WLAN after a handoff or handover (hand out) of a communication unit to the WAN. Current practice in such loosely coupled systems is to disconnect the on-hold calls or route them to voice mail. In either event the call is no longer available to the communication unit or user thereof, thus contributing to inconvenience and lack of satisfaction.

Therefore, a need exists for methods and apparatus to facilitate on hold call retrieval and routing for communication units operating within such loosely coupled communications networks

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
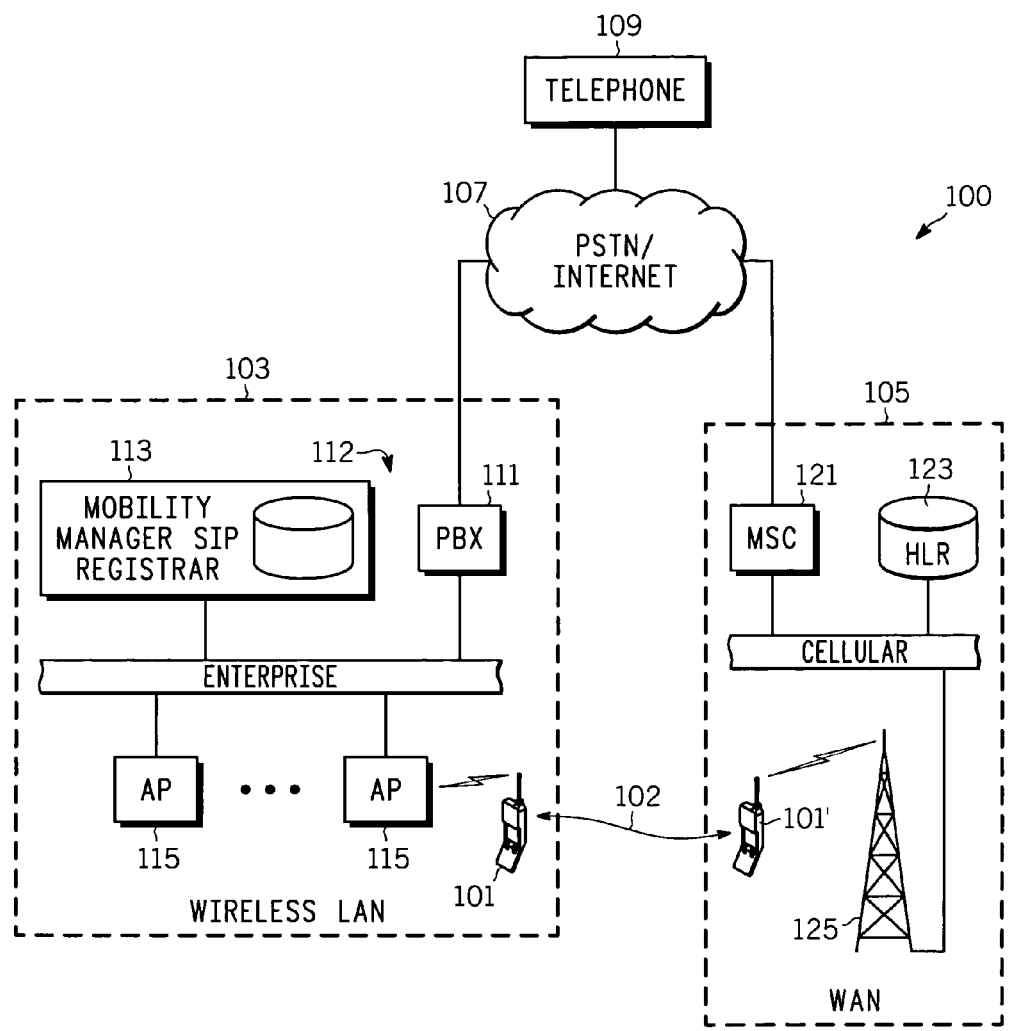
FIG. 1 depicts, in a simplified and representative form, an exemplary system diagram for a loosely coupled communication network where methods and apparatus facilitating the retrieval and routing of on-hold calls can be advantageously utilized.

In overview, the present disclosure concerns wireless communication devices or units, often referred to as communication units, such as portable or cellular phones or handsets or two-way radios and the like and communication networks or systems that provide services such as voice and data communication services to or for such communication units. More particularly various inventive concepts and principles are embodied in loosely coupled communication systems or constituent elements, communication units, and methods therein for routing or retrieving and managing on-hold calls for the communication unit as the unit moves from a first communication network to a second communication network. Note that "wireless communication unit" may be used interchangeably herein with "communication unit", "communication device" or "unit" and each of these terms denotes a device ordinarily associated with a user and typically a wireless communication unit that can be used with a public network as well as a private or enterprise network. Examples of such units include personal digital assistants, personal computers equipped for wireless operation, a cellular handset or device, or equivalents thereof provided such units are arranged and constructed for operation in different networks.

The communication systems or networks and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, 4G OFDM (Orthogonal Frequency Division Multiple access) systems, integrated digital enhanced networks and variants or evolutions thereof. Furthermore the wireless communication units or devices of particular interest have short range wireless communication capability normally referred to as wireless local area network (wireless LAN or WLAN) capabilities based on standards such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate management, routing, or retrieval of one or more on-hold calls from a first wireless communication network (first communication network or first network) to provide these on-hold calls to the communication unit while operating in a second wireless communication network (second communication network or second network). This is facilitated by routing the on-hold calls over a call leg established and used to effect a handout of the on-hold call when the wireless communication unit moves to the second network. In this manner, advantageously on-hold calls may be routed to the communication unit without dropping the on-hold call or otherwise not making the on-hold call available in a loosely coupled system, e.g. where the second network is not aware of the first network, since the first and second network are only coupled via the PSTN and use only conventional wired telephony protocols to communicate.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, an exemplary and representative environment or system diagram for a loosely coupled communication network 100 where methods and apparatus facilitating the retrieval and routing of on-hold calls can be advantageously utilized will be discussed and described. In one embodiment one or more calls have been placed on-hold by the communication unit in a first network, such as a wireless LAN, a corresponding wireless communication unit has been handed out to a second network (now operating in the second network), and the on-hold calls need to be made available to the communication unit in the second network. The diagram of FIG. 1 generally shows a communication unit 101 that is portable or mobile and that can move (depicted generally by arrow 102 and communication unit 101') throughout a service area of a first wireless communication network (first network) 103 and a service area for a second wireless communication network (second network) 105. The wireless communication unit 101 ordinarily has a first network number and IP address so that other units can contact the unit in the first network as well as a second network number so that other units can contact the unit in the second network. Note that in practical systems there may be a multiplicity of such wireless communication units where for the sake of simplicity one has been depicted.

In this exemplary embodiment, the first network 103 is or includes a wireless local area network (WLAN) using packet data based methodologies including VoIP (Voice Over IP) and the second network 105 is, in one embodiment, a WAN, such as a cellular voice or packet data network or other cellular or cellular like network otherwise referred to as a cellular WAN or simply WAN. While the arrow 102 and alternative location for wireless communication unit designated 101' suggest physical movement, this may not be the case since the WAN likely has overlapping coverage with the wireless LAN. The arrow may simply denote a change in which network the communication unit is operating or registered on for a variety of reasons. The first communication network or wireless LAN is inter coupled to the second communication network as well as other communication devices such as plain old telephone set (POTS) 109 or IP phones by a public network, such as the public switched telephone network or Internet 107.

The first network 103 in the wireless LAN embodiment includes a communications network switch 112 comprising in certain embodiments a switching function 111 that may alternatively be referred to as Private Branch Exchange (PBX), enterprise server, media gateway controller (MGC) and so on and a mobility manager 113. The PBX 111 and mobility manager 113 are inter coupled via the Enterprise infrastructure or wired portion of the LAN as well as further coupled to a plurality of access points 115. The access points support the wireless LAN air interface with the wireless communications units using, as noted earlier, a known protocol and associated techniques, such as one or more IEEE 802.11 protocols.

The first network 103 in one or more embodiments further relies on and utilizes an application level protocol for managing connections or sessions between the various network entities including wireless communication units. This protocol in one embodiment is a known Session Initiation Protocol (SIP) but other similar protocols, such as H.323, with similar functionality could be used. The protocol, known as H.323, is defined and promulgated by the International Multimedia Telecommunication Consortium (IMTC) (see http://www.imtc.org/h323.htm and associated websites for descriptive documents). The Session Initiation Protocol (SIP) is defined by the Internet Engineering Task Force (IETF) in a document designated RFC3261. Much of the discussion below, where relevant will assume that SIP and SIP constructs and entities are being utilized in the WLAN and that legacy cellular or dispatch protocols are being utilized in the WAN, where it is understood that similar functions and methods are available using other protocols if desired.

The mobility manager 113 includes, in the SIP embodiment, a known SIP Registrar, SIP Proxy, etc. The mobility manager 113 is responsible for maintaining network contact information (sometimes referred to as location information) for the various wireless communication units and thus is utilized by network entities as a central point for setting up connections or sessions with other network entities. The mobility manager will be described in further detail below with reference to FIG. 3.

The second network or WAN 105 includes a network switching function 121, alternatively referred to as a mobile switching center (MSC). The MSC is coupled to a home location registrar (HLR) 123 and numerous base transmitter sites (BTS) 125 all as known. The MSC 121 further comprises a visitor location registrar (VLR not specifically shown) as is known. The BTS 125 supports the air interface with the wireless communication units, such as unit 101', e.g. unit 101 when that unit is in the coverage area of and operating on the second network. Note that first and second networks will be used in the description but these terms may be interchanged, e.g. the first network could be a WAN and the second network a WLAN, or both could be WLANs for example, provided the appropriate functionality is available within such networks.

Also it will be appreciated that other entities or functions that are part of typical networks are not specifically shown but understood to be present and operational. For example in the first network 103 or WLAN, in addition to a multiplicity of Access Points 115 supporting wireless links with wireless communication units and thereby coupling the units to the balance of the network or enterprise network, other typical network routing equipment such as servers, concentrators, routers, etc. may be present. The second network or wireless WAN (hereafter WAN) similarly typically includes a plurality of base transmitters and antenna towers as well as base site controllers that all serve to provide a radio access network for communication units as well as the various registrars, billing servers and so forth. Note that while the first and second networks 103, 105 are referred to as wireless networks, much of these networks or the respective elements thereof are inter coupled using terrestrial based links, e.g. cables or wires. For example, the switching functions 112, 121 are normally coupled to the balance of their respective networks using known cables or wires. Furthermore the WLAN 103 can include and support voice services for stationary or static communications units that are coupled to the network using conventional cabling or wires. Thus the discussions below may refer alternatively to the first communications network 103 as a WLAN or LAN.

With this network architecture where the networks are loosely coupled and thus the WAN is not aware of the wireless LAN, problems associated with handling, routing or retrieving on-hold or call waiting calls are presented. These issues are compounded by other factors such as the ability to place different numbers of calls on hold in a typical wireless LAN than can be placed on hold in a typical WAN. For example a multiplicity, such as four, calls can be placed on hold in some embodiments of a wireless LAN whereas a typical WAN allows only two call appearances, e.g. an active call and an on-hold call or two on-hold calls. With this network discussion and description, the balance of these discussions will be devoted to various advantageous and inventive concepts and principles embodied as one or more apparatus and methods for resolving various of these issues.

Figure 2:
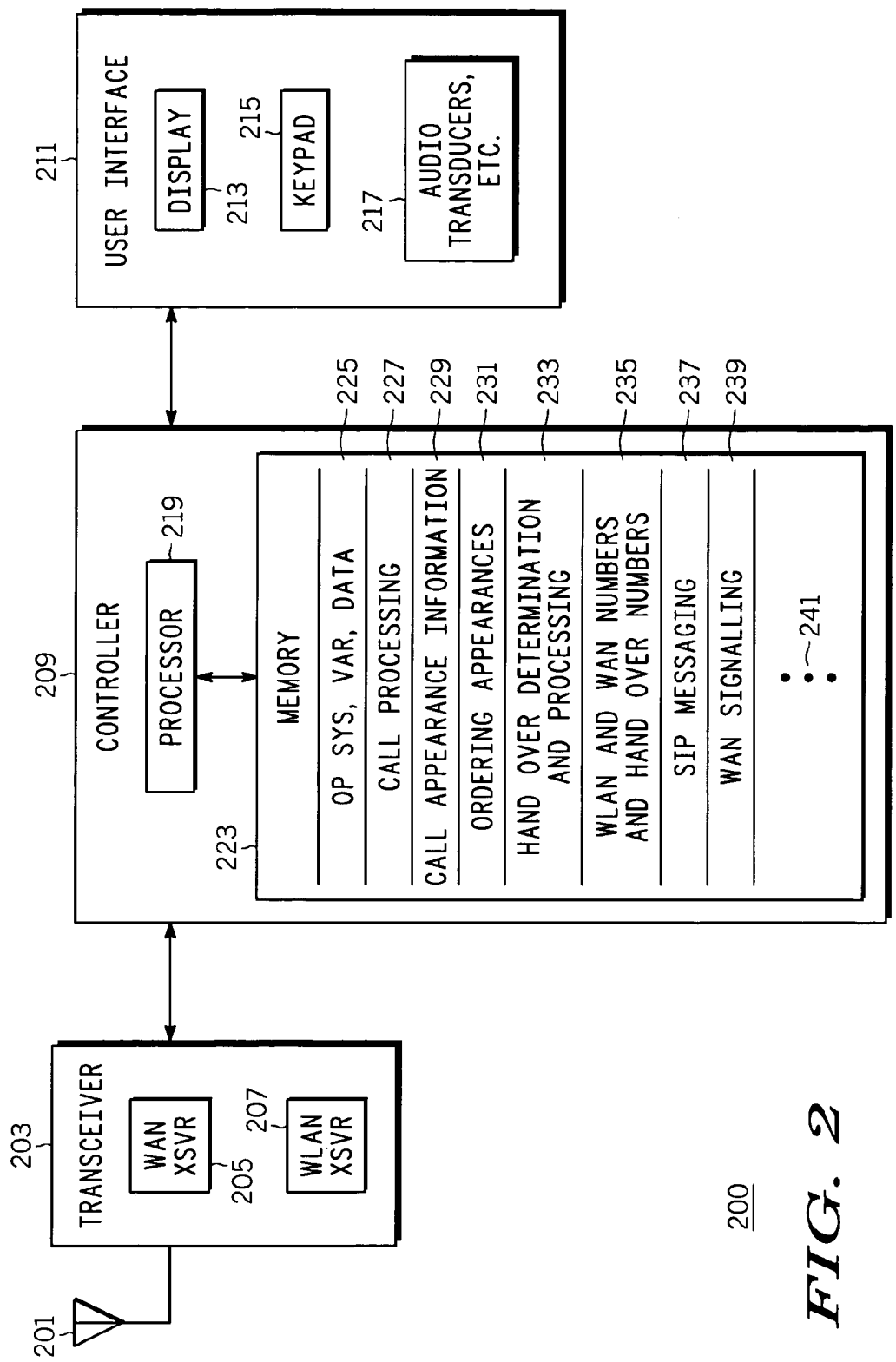
FIG. 2 depicts a simplified block diagram of a wireless communication unit arranged for facilitating the retrieval of on-hold calls in the system of FIG. 1.

Referring to FIG. 2 a simplified block diagram of a wireless communication unit, similar to communication unit 101 arranged for facilitating the retrieval of on-hold calls in the system of FIG. 1 will be discussed and reviewed. The communication unit 200 is structurally similar or identical to communication units, such as wireless handsets, available from manufacturers like Motorola, however the functionality of these conventional units is modified according to the principles and concepts disclosed and described herein in order to enjoy the advantages noted. The communication unit includes an antenna 201 coupled to a transceiver 203. The transceiver 203 is composed of at least one transmitter/receiver but may as depicted be comprised of one or more WAN transceivers 205 (one shown) and one or more additional wireless LAN transceivers 207 (one shown). In one embodiment, one transmitter/receiver 205 is for communicating over a wide area network (WAN) while another transmitter/receiver 207 is for communicating over a wireless LAN. These transceivers and their functionality are generally known and whether embodied as one or several transceivers will depend on technologies employed as well as the air interface technologies utilized in the specific WANs and LANs that the communication unit is configured to interface to or interact with.

The transceiver 203 is coupled to a controller 209 and the controller is further coupled to a user interface 211. The controller 209 provides over all control for the communication unit, call processing, and interfacing tasks associated with the transceivers and user interface. The user interface includes a conventional display 213, a keyboard or keypad 215, audio transducers 217, and the like. The controller 209 further comprises a processor 219 and a memory for storing software instructions and other information and data, the memory and processor inter coupled as depicted, as well as likely other known functionality that is not relevant to the present discussion. The processor is comprised of one or more general purpose processors and digital signal processors available from various suppliers, including Motorola. The memory 223 can include both volatile and non-volatile memory and can be at least in part integral to the processor 219 or may also be external to the processor.

The memory includes various software routines or programs and data including an operating system with variables and data 225 that when executed by the processor results in the controller performing the above generally identified duties as well as those tasks described below in conjunction with other routines. The other routines or programs include call processing routines 227 that are generally known and will vary with the specific requirements of the networks that are being utilized for service. Other routines and databases will be listed and their respective functionality will become evident with the detailed explanations below. These routines include call appearance information 229, a routine for ordering the call appearance information 231, handover determination and processing routines 233, wireless communication unit telephone numbers, including wireless LAN and WAN numbers as well as handover number(s) 235, SIP messaging routines 237 for use, for example, in the wireless LAN, WAN signaling routines 239 for use while operating in the WAN, and various other routines and databases 241, such as phone books, user interface drivers, and various applications, that are not specifically shown and in many instances not further relevant but that will be evident to one of ordinary skill.

In operation, the communication unit 101, 200, as discussed above, is capable of and arranged and constructed for operating on or operation within a loosely coupled communication network comprising multiple communication networks, such as wireless LAN 103 and wireless WAN 105. The wireless communication unit comprises the transceiver 203 that is configured to support an air interface with a first communication network, for example wireless LAN 103 and an air interface with a second communication network, for example WAN 105. Furthermore the communication unit comprises the controller 209 that is arranged to control and cooperatively operate with the transceiver to place an active call on-hold to provide an on-hold call at the first communication network and thereafter retrieve the on-hold call from the first communication network while the wireless communication unit is operating in the second communication network via a call leg established for coupling the on-hold call to the wireless communication unit. Placing the active call on hold is accomplished via known signaling conventions that depend on whether the active call is being placed on hold in the wireless LAN or WAN where the SIP messaging routines 237 or WAN signaling routines 239 are, respectively, used.

For example, the wireless communication unit, specifically the controller cooperatively with the transceiver is operable to communicate over a call leg between the second communications network and the first communications network and the on-hold call is coupled to the transceiver over the call leg. Note that this call leg can be a call leg set up to facilitate a handover when the communication unit moved to the second network, such as one or more call legs set up to facilitate on-hold call coupling, retrieval or routing to the wireless communication unit via the second network. More specifically the controller cooperatively with the transceiver is operable to determine that a handout from the first communication network to the second communication network is desired using the handover determination routines 233 and responsive thereto either i) passively establish the call leg by receiving and connecting to a call from the first communication network via the second communication network, the call corresponding to the on-hold call or ii) proactively establish the call leg by initiating and connecting to a call from the first communication network, via this call leg, through calling, via the second communication network, a handout number that terminates in the first communication network thereby resulting in the on-hold call being connected to the call.

Determining that the handover or handout is desired can be accomplished in various ways with many embodiments assessing some indication of signal quality, such as signal strength, frame error rate, and so forth. This determination can be made by either the wireless communication unit 200 directly or the infrastructure of the serving network, namely the mobility manager 113 together with a serving access point 115 in the wireless LAN 103 or the serving base transmitter site 125 in the WAN 105. In either event the determination or triggering event or condition for a handout or handover must be made known to both the wireless communication unit and the relevant infrastructure above noted and thus both entities have determined that a handover is desired. In some embodiments the communication unit may inform the infrastructure, such as the network switch 112 or mobility manager 113 that a handout is desired by sending a message to a call controller via the first network, by sending a message to the mobility manager via the first network, or by initiating a call from the second network to a handout number that terminates on the controller or on the mobility manage. In other embodiments the call controller or mobility manager may determine that the handout is needed and send a message to inform the communication unit of this need.

When the determination is found and reported for situations where the wireless communication unit is operating in the wireless LAN 103, the unit as controlled by the handover processing routines 233 can register with the WAN and wait for the wireless LAN network or first communication network or network switch 112 to initiate or dial out a call corresponding, for example to the on-hold call, that is addressed to the unit's WAN number 235 and thus passively establish the call leg by receiving and answering this call from the first communication network. This may be referred to as forwarding the on-hold call, essentially as a new call.

Alternatively given similar circumstances, the wireless communication unit, via the handover processing routines 233 can proactively establish the call leg by registering with the second communication network or WAN and initiating and connecting to a call directed to a handover or handout number 235 that terminates in the first communication network and results in connecting the on-hold call to this call. In this embodiment, the wireless communication will be provided with one or more handover numbers 235, for example at configuration or provisioning of the unit, or by the network switch 112, e.g. call controller or mobility manager 113 at the determination or perhaps as each call is connected to the unit or placed on hold or at various other occasions that will be evident to one of ordinary skill given the concepts and principles disclosed here.

Note also that the wireless communication unit in order to make the handout or handover as transparent to the user of the unit as possible may also need to distinguish the call or a particular on-hold call that is being handed out from other calls that are being received in the second communication network or that were on hold in the first communication network. The controller can distinguish the call from other calls within the second communication network by comparing call information to expected call information at least for a certain, ordinarily short, as in seconds, time frame by looking at the calling party identifier. If this identifier is equal to a unique identifier, such as the CLI (calling line identifier) of the network switch 112 (PBX CLI) or the number of the communication unit itself, as stored with the call appearance information 229 the call will be treated as the on-hold call that has been forwarded. Note that this is not an issue in the case of a single on-hold call with the first communication network if the proactive establishment procedure is followed, since the on-hold call will be connected to the call leg established for the purpose of handing out the on-hold call.

Where the on-hold call is one of a plurality of on-hold calls at the first communication network, the controller can distinguish one on-hold call from another by ordering using the ordering routines 231, local call appearance or on-hold call information 229 corresponding to the plurality of on-hold calls according to an order for connecting the plurality of on-hold calls to the call. For example, the controller can order the local on-hold call information according to an attribute associated with each call, such as an on-hold time for each of the plurality of on-hold calls and connect the oldest or youngest first. Other attributes that are unique to each call appearance can also be used. Note that the call appearance information is only available given the loosely coupled nature of the overall system as a result of prior operation with the first communication network and signaling conventions, such as SIP, used therein. The important thing for successful operation and customer satisfaction is that the ordering process and parameters have to be predetermined such that the network switch 112 and the wireless communication unit reach the same result as to which call will be forwarded and connected and in what order if multiple on-hold calls will be handed out. If an active call is also being handed out the order for doing so can be predetermined, for example, first or second or etc. or the active call can be ordered with the on-hold calls.

Using these approaches and the user interface 211 of the wireless communication unit, various operational embodiments are available. For example, when the call is connected it can be announced to the user or hidden from the user. In any event and, responsive to an indication from the user interface, such as activation of a talk button, the controller cooperatively with the transceiver can connect the call with the user and the user interface can provide updated information for the on-hold call corresponding to the call. This results in the on-hold call now being off hold, connected with a peer communication unit, and being active in the second communication network. In other embodiments, the controller cooperatively with the transceiver can place the call on-hold at the second communication network by connecting the call and sending hold information corresponding to the call to the second communication network. When this is hidden from the user, for example, where the connecting the call and the sending hold information corresponding to the call are done automatically, the user interface maintains on-hold information for the on-hold call. The end result is the on-hold call at the first communication network now corresponds to the call that is on-hold at the second communication network.

Furthermore when there are a plurality of on-hold calls at the first communication network, the wireless communication unit, specifically the controller cooperatively with the transceiver, after placing a first call on-hold at the second communication network, can facilitate establishment, passively or proactively of an other call leg by connecting to an other call with the first communication network via the second communication network where the other call corresponds to an other on-hold call and then place the other call on-hold by sending hold information corresponding to the other call to the second communication network. This can be as well be done with or without notifying the user of the wireless communication unit, e.g. transparently or otherwise with corresponding user interface adjustments. Note that no more than two on-hold calls can be handed over to the typical WAN and thus on-cold calls in excess of two will either remain on-hold at the wireless LAN or alternatively be for example, forwarded to voice mail. Additionally if there is an active call as well as an on-hold call at the first communication network, the active call can be handed out either prior to or after the on-hold call is handed out so long as the network switch and the communication unit use the same order. If the active call is handed out first relatively less time between a determination that a handover is required and the actual handover is likely indicated while if the on-hold call is handed out first it is easier to make the hand out transparent to the user.

Furthermore using the above discussed principles and concepts the wireless communication unit with the user interface 211 and so forth can be used to effect handovers from the first to the second communication network where the first communication network is a WAN and the second communication network is a wireless LAN or vice-a versa. In this embodiment, the controller cooperatively with the transceiver is operable to determine that a handout from the first communication network to the second communication network is desired and responsive thereto, automatically and while maintaining the on-hold information for the on-hold call at the user interface: take the on-hold call off of hold at the first communication network by sending hold information to the first communication network to provide a corresponding active call; establish the call leg by initiating a call and connecting to the call through calling a number that terminates in the second communication network and results in the on-hold call that is taken off of hold at the first communication network being connected to the call; and then place the call on-hold at the second communication network by sending hold information corresponding to the call to the second communication network.

Figure 3:
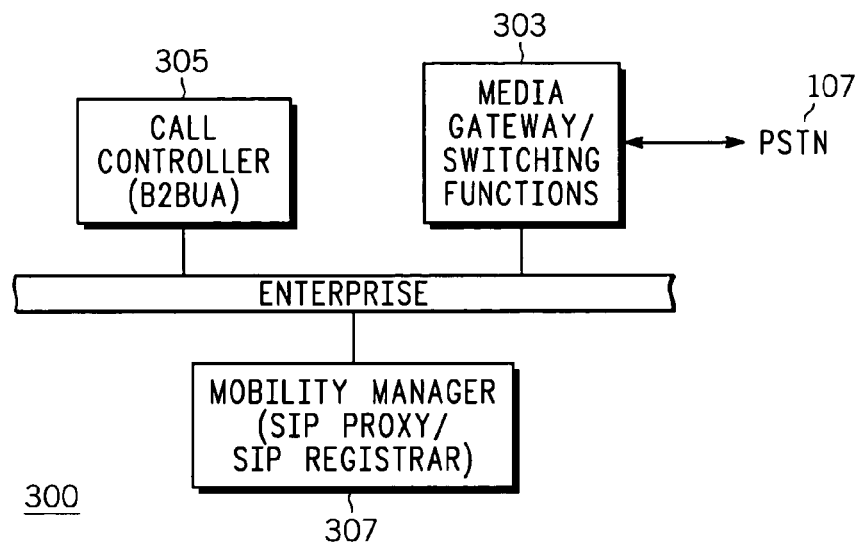
FIG. 3 is a simplified block diagram of a network switch that is arranged for routing on-hold calls in the system of FIG. 1.

Referring to FIG. 3, a simplified block diagram of a communication network switch 300, such as the network switch 112, that is arranged for routing on-hold calls in the system of FIG. 1 will be discussed and described. The network switch 112 may serve a single enterprise location, such as an office building or may serve multiple enterprise sites, possibly located in different cities. The network switch 112 or enterprise server may serve a WLAN hotspot, or multiple WLAN hotspots. It may also serve one or more WLAN coverage areas in private homes that may be connected to the network switch 112 by such means as IP broadband connections. Generally the network switch operates to establish connections between wireless communication units within the WLAN, such as communication unit 101 and various peer communication units (not shown). Note that the connection from the wireless communication unit via an access point 115 is a packet data connection and the connection from the peer communication unit will depend on the particulars for the peer unit. For example if the peer communication unit is another static or wireless communication unit within the WLAN or LAN (not shown) the connection will also be a packet data based connection, while if the peer unit is an ordinary phone, such as POTS 109 outside the LAN or WLAN 103 the connection to the wireless LAN is likely a circuit switched voice connection.

The communication network switch 300 comprises a gateway or switching function 303 and a controller or call controller 305 including a B2BUA (back to back user agent, a SIP entity) such as available from Avaya with their MultiVantage product line. Rather than the B2BUA a conventional SIP server can be used. Generally the gateway or switching function operates to couple the wireless LAN and devices therein to the PSTN 107 and thus external phones, such as POTS 109, and other networks, such as the WAN 105. More specifically the switching function is routing traffic or calls between the various devices and networks. The controller 305 is responsible for call control and call signaling and handling on-hold or call waiting calls and handling connections of these calls among particular communications units. The B2BUA is included as part of the controller 305 to facilitate an interface using SIP constructs between the controller and the rest of the LAN including access points, communications units, the switching function 303 and a mobility manager 307.

The mobility manager 307 is included in certain embodiments of the network switch 300 and further often comprises a SIP Proxy and SIP Registrar. The mobility manager 116 operates to facilitate mobility of the wireless communication units within the wireless LAN as well as between networks. This includes facilitating handover activities for active calls and on-hold calls associated with communication units from one to the other network or within the wireless LAN when required. The SIP proxy and SIP Registrar operate according to known techniques to provide a central point or network address that all communication units can contact when they intend to set up a call or connection with another unit. The proxy server/SIP Registrar will have the most up to date network contact or location information for or address, e.g. know where to find, another communication unit or the network switching function 110 in accordance with known techniques. The mobility manager and constituent functions in one or more embodiments can be implemented as software programs running on a general purpose, computing platform such as those available from suppliers, such as Hewlett Packard and Dell, that are suitable for networked operation. The switching function 303, controller 305, and mobility manager 307 are all inter coupled or networked via the LAN as depicted. Note that one or more or all of these entities may be co-located in one or more common computing platforms according to the practitioners desires and thus may be viewed as largely logically distinct entities. The discussions below will be devoted to the respective and relevant functionality and interaction of these respective entities with each other as well as other network entities pursuant to resolving the on-hold call routing and retrieval issues noted above.

The communication network switch 300 as earlier noted is operable to route calls for a first communication network, such as the wireless LAN 103 as well as route such calls to or from other networks, such as the WAN 105. The communication network switch comprises the switching function 303 that is operable to couple the first communication network to a second or other communication networks, via for example the PSTN 107, and thus communication units within such networks. Note that the first communication network and the second communication network comprise a loosely coupled communication network, such as network 100. The communication network switch further comprises the controller 305 that is arranged to control and cooperatively operate with the switching function to place an active call on-hold responsive to a signal from a communication unit to provide an on-hold call at the first communication network and thereafter couple, via a call leg to the second communication network, the on-hold call to the wireless communication unit, the call leg established for coupling the on-hold call to the wireless communication unit after a handout of and while the wireless communication unit is operating in the second communication network.

The communication network switch, in some embodiments, further includes the mobility manager 307 that, as noted above, is operable to facilitate mobility of wireless communications units including the wireless communication unit 101 by tracking network contacts (addresses or network location information within the LAN or the WAN) for the wireless communication units. The mobility manager cooperatively with the controller and the switching function and responsive to determining that a handout from the first communication network to the second communication network is desired is operable to establish the call leg between the second communications network and the first communications network. More specifically the mobility manager cooperatively with the controller and the switching function is operable to one of i) proactively establish (dialing out as discussed above but from the communication network switch perspective) the call leg by forwarding, via the second communications network, the on-hold call to the wireless communication unit as an active call and ii) passively establish (dialing in but from the switch perspective) the call leg by receiving a call from the wireless communication unit via the second communication network that is directed to a handout number and, responsive to receiving the call, connecting a peer call leg of the on-hold call to the call leg as an active call. In one embodiment the connecting the peer leg to the call leg is accomplished by conferencing together the peer leg, the call leg and the communication unit leg of the on-hold call in the first communication network.

In certain embodiments where an active call in addition to an on-hold call needs to be dealt with at handover, the network switch has alternative ways of dealing with the active and oh-hold call. For example, the controller cooperatively with the switching function can be arranged and operable to hand out an active call for the wireless communication unit by establishing an other call leg by forwarding, via the second communications network, the active call to the wireless communication unit either i) after the on-hold call has been forwarded and responsive to the on-hold call being connected by the wireless communication unit or ii) prior to the on-hold call being forwarded to the wireless communication unit, where the choice may depend on time required to complete the active call handover or handout versus transparency of the total process to the user. Note that as earlier mentioned the wireless communication unit and the controller must use the same order for handing out. In another embodiment, the controller cooperatively with the switching function is operable to hand out an active call after the on-hold call has been connected to the call leg by establishing (e.g. passively) an other call leg by receiving an other call from the wireless communication unit via the second communication network that is directed to another handout or handover number and, responsive to receiving the other call, connecting the active call to the other call leg.

When the on-hold call is one of a plurality of on-hold calls, the mobility manager cooperatively with the controller is operable to order the plurality of on-hold calls according to a predetermined attribute, such as the age or time on hold or other attribute that is unique to each of the respective on-hold calls, thereby insuring that the communication network switch and the wireless communication unit have a common reference for any one of the plurality of on-hold calls, where it is understood that the plurality of calls will be connected in accordance with the resultant order of the plurality of on-hold calls. As noted above it is important that the network switch and wireless communication unit agree on the rules for ordering and rules for handling on-hold calls as ordered to minimize user inconveniences and in short make these handover or handout processes as transparent to the user as possible.

Given an understood reference for each of the plurality of on-hold calls, the communication network switch, specifically the controller cooperatively with the switching function can be arranged to be operable to hand out an other on-hold call by establishing an other call leg by forwarding, via the second communications network, the other on-hold call to the wireless communication unit after the on-hold call has been forwarded and connected, perhaps responsive to the connected signal, by the wireless communication unit. This can be transparent or hidden from the user of the targeted communication unit.

Alternatively the controller cooperatively with the switching function can operate to hand out an other on-hold call after the on-hold call has been connected to the call leg by establishing an other call leg by receiving an other call from the wireless communication unit via the second communication network that is directed to a second handout number and, responsive to receiving the other call, connecting the other on-hold call to the other call leg. Note that the handout number and second handout number can be the same number or different numbers or numbers that correspond to the on-hold calls at the practitioner's choice with varying strengths and weaknesses with each approach. Each of these numbers will terminate at the first communication network.

In certain other embodiments the communication network switch is operable to facilitate a handin of on-hold calls from the WAN 105 to the wireless LAN 103. For example, the mobility manager cooperatively with the controller and the switching function and responsive to determining that a handin of the wireless communication unit from the second communication network to the first communication network is desired, can establish an active call leg with the wireless communication unit in the first network and connect the call leg to the active call leg, thereby connecting the on-hold call at the second communication network to the wireless communication unit via the first communication network. Note that this embodiment only works if the on-hold call is anchored, e.g. routed through or via the network switch to begin with, so this amounts to making the connection with the active call leg and the existing peer leg corresponding to the call leg at the network switch. If the controller cooperatively with the switching function receives a signal from the wireless communication unit directing that the active call leg be placed on hold, the net result of completing this process of handing out the on-hold call from the first to the second communication network where it is placed on hold and subsequently handing back in the call, results in the on-hold call being on-hold again at the first communication network. Note that this latter described behavior can be used to handin or handover any on-hold call at the WAN so long as the call is anchored at or routed through the network switch and thus would apply to calls from external communication units, such as POTS 109 to the wireless LAN number for the communication unit that terminate on the network switch, calls being forwarded by the network switch to the WAN number of the communication unit, calls that are established by the communication unit with external units by dialing a number that terminates on the network switch and then over dialing the number the number of the external unit, or calls with communication units operating within the wireless LAN to either the wireless LAN or WAN number for the communication unit.

Figure 4:
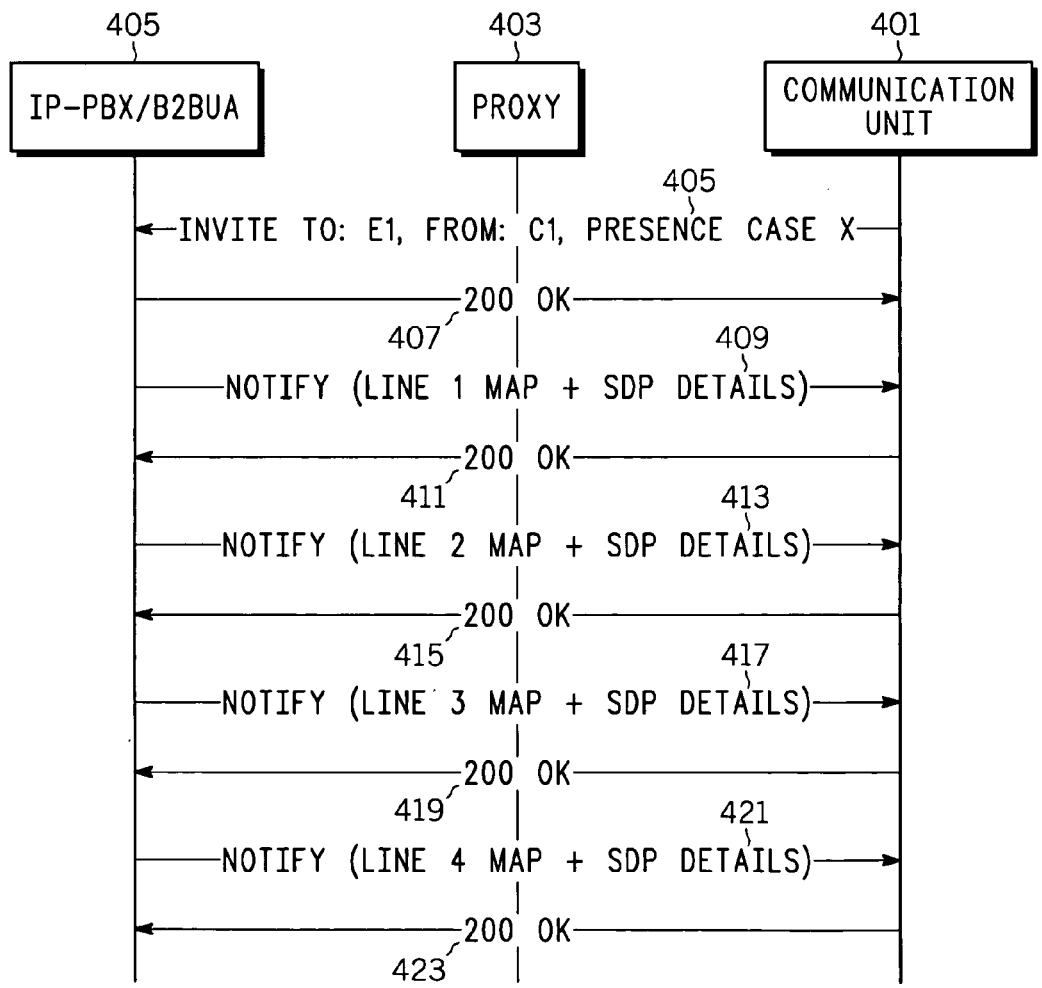
FIG. 4 depicts a ladder diagram depicting in an exemplary manner the signaling interaction between a wireless communication unit and network switch for synchronizing the wireless communication unit upon entry into a wireless LAN.

Referring to FIG. 4, a ladder diagram depicting in an exemplary manner the signaling interaction between a wireless communication unit or mobile station 401, such as wireless communication unit 101, 200, the SIP Proxy 403, and network switch 405, such as the communication network switch 112, 300, where the interaction for synchronizing the wireless communication unit upon entry into a wireless LAN will be discussed and described. Note that alternative structures with similar functionality can also implement the methods depicted by the ladder diagrams and that various protocols, such as SIP and H.323 can be utilized. Generally synchronization may be required when the wireless communication unit is handed in to a wireless LAN, such as 103, when the wireless unit powers on via for example the user interface or as a result of a dead battery, and the like. During the time of absence for the wireless communication unit on-hold or active calls could have changed status, by for example, the calling party disconnecting the call and so forth. For these and other such reasons the list of valid call appearances in the wireless LAN may not match the memory call appearances as last known by the communication unit and thus synchronization of some form may be needed.

In any event the ladder diagram depicts a method of synchronizing call appearance information between a network switch and a wireless communication unit operable in a loosely coupled network, where the network includes as noted above a first communication network and a second communication network. The method comprises determining, after an absence, that the wireless communication unit is again present in the first communication network; and exchanging messages between the wireless communication unit and the network switch to provide a listing of call appearance information for calls corresponding to the wireless communication unit. Note that the determination on the communication unit's part is detecting, for example, beacon signals corresponding to and then associating with the wireless LAN in one IEEE 802.11 embodiment and on the part of the network switch receiving a message 406 comprising a SIP INVITE message. Thus in this embodiment, the determining that the wireless communication unit is present comprises exchanging a session initiation protocol (SIP) INVITE message 406 between the wireless communication unit and the network switch, where the SIP INVITE message can further include a presence state, such as walk in if the device has recently returned to the LAN after an extended absence, handin suggesting the device was operating in the WAN, or power up indicating the device is being powered up. Note that in one embodiment the SIP INVITE is To the LAN number, E1 and From the WAN number, C1 that corresponds to the wireless communication device.

Responsive to the Invite message a SIP OK message 407 is returned. While not depicted, in some embodiments the exchanging messages can comprise exchanging a SIP OK message that includes all or a portion of the listing of call appearance information, where the SIP OK message is directed to the wireless communication unit. In other embodiments, the exchanging messages further comprises exchanging a plurality of SIP NOTIFY messages 409, 413, 417, 421, the plurality of SIP NOTIFY messages collectively including the listing of call appearance information, the call appearance information further comprising one of a call identifier, a From field, a To field, a call state field (active, on-hold, etc), and session description protocol information, where each of the SIP NOTIFY messages are responded to with a SIP OK message 411, 415, 419, 423 respectively, from the wireless communication unit 401 to the network switch.

Figure 5:
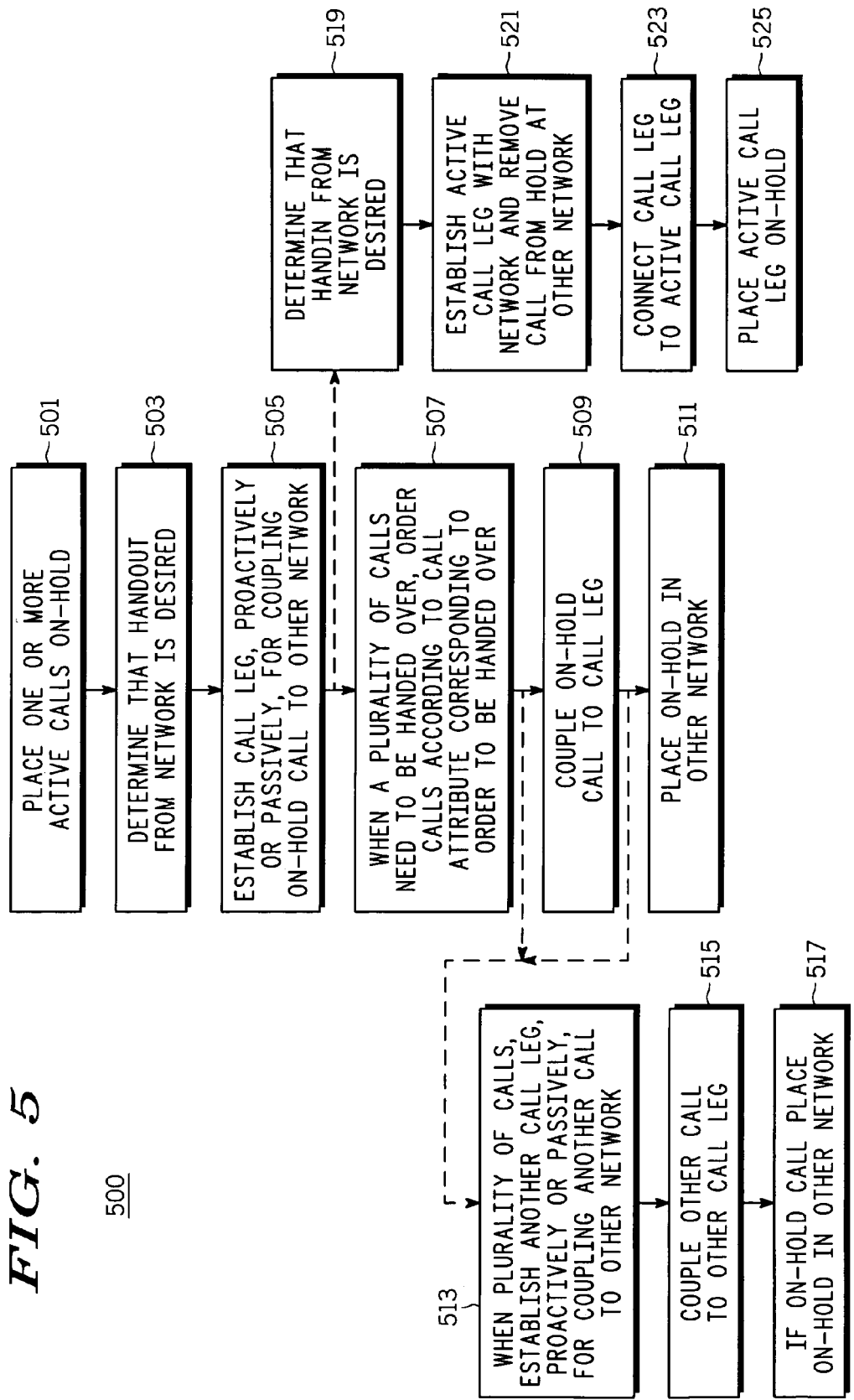
FIG. 5 depicts a flow chart of a method of routing and retrieval of on-hold calls.

Referring to FIG. 5, a flow chart of a method embodiment for routing calls to a wireless communication operating in a loosely coupled network comprising a first and a second communication network will be discussed and described. Generally the method can be viewed as being practiced at least in part in a network switch, such as network switch 112, 300 or a wireless communication unit, such as wireless communication unit 101, 200 however the method can be practiced in other apparatus with similar functionality. Some of the discussion below will be a review of concepts and principles explained above and thus will be provided more in a summary form. In overview the method comprises various embodiments of establishing one or more call legs and coupling on-hold calls or active calls via these call legs to the communication unit.

The method 500 begins at 501 with placing one or more active calls on-hold and if at the communication network switch this will be responsive to a signal from a communication unit to provide one or more corresponding on-hold calls at the first communication network. Then 503 determines that a handout from the first communication network to the second communication network is desired. Next at 505 establishing a call leg, either proactively or passively, for coupling the on-hold call from the first communication network to the second communication network is undertaken. Note that in some embodiments the establishing the call leg is responsive to the determining at 503 and further comprises either proactively or passively establishing with the communication unit or network switch that initiates the call leg being referred to as proactively establishing while the other is referred to as passively establishing. In any event from the perspective of the network switch proactively establishing the call leg is accomplished by forwarding, via the second communications network, the on-hold call to the wireless communication unit (units second network number) as an active call. Passively establishing the call leg from the network switches perspective is accomplished by receiving a call from the wireless communication unit via the second communication network that is directed to a handout number and, responsive to receiving the call, connecting the peer leg of the on-hold call to the call leg as an active call.

When the on-hold call is one of a plurality of on-hold calls or an active call is involved in some embodiment 507 shows ordering the plurality of calls including on-hold calls according to a predetermined attribute, such as time on hold or other unique attribute of the respective on-hold calls. Note that the network switch and communication unit will need to know the ordering algorithms, etc. and both will need to perform this process, thus ensuring that the communication network switch and the wireless communication unit have a common reference for any one of the plurality of calls including on-hold calls. Then 509 shows coupling the on-hold call or first as ordered on-hold call (note this is an active call that corresponds to the on-hold call), via the call leg, to the wireless communication unit, after a handout of the wireless communication unit and while the wireless communication unit is operating in the second communication network and 511 indicates placing the call that was coupled at 509 on-hold in the other or second communication network. This process is accomplished by the wireless communication unit signaling, for example, the MSC with hold information and can be done transparently to or hidden from the user.

In other embodiments, when there is a plurality of calls, either on-hold or on-hold and active, 513, shows establishing another call leg, proactively or passively as noted above, for coupling another call to the other network and 515 shows coupling the other call to the other call leg. These processes can be used in various manners, such as handing out an active call for the wireless communication unit by establishing an other call leg by forwarding, via the second communications network, the active call to the wireless communication unit, either after the on-hold call has been forwarded and responsive to the on-hold call being connected by the wireless communication unit, e.g. after 509, or prior to the on-hold call being forwarded to the wireless communication unit, e.g. before 509. Alternatively handing out an active call after the coupling of the on-hold call, via the call leg, to the wireless communication unit, e.g. after 509 by establishing an other call leg by receiving an other call from the wireless communication unit via the second communication network that is directed to a handout number, that may be the same or different than the number used at 515 and, responsive to receiving the other call, connecting the active call to the other call leg.

Another example of applying 513, 515 is handing out a second on-hold call for the communication unit at the first communication network by establishing an other call leg by forwarding, via the second communications network, the second on-hold call to the wireless communication unit after the on-hold call has been forwarded and connected by the wireless communication unit, e.g. after 513. Alternatively the handing out the second on-hold call for the communication unit after the on-hold call has been connected to the wireless communication unit, via the call leg, e.g. after 509, can be accomplished by establishing an other call leg by receiving an other call from the wireless communication unit via the second communication network that is directed to a second handout number and, responsive to receiving the other call, connecting the second on-hold call to the other call leg. Thus the process at 513 can be placed either after 507 or after 509 as depicted by the dashed lines. In any event 517, then shows, if the other call at 515 is an on-hold call for the communication unit, this call can also be placed on-hold at the other or second communication network via known signaling.

Furthermore the method 500 in some embodiments includes at 519 determining that a handin of the wireless communication unit from the second communication network to the first communication network is desired, where this process can follow 505 or any other process after 505 as suggested by the dashed line. Then 521 shows establishing, responsive to the determining that a hand in is desired, an active call leg with the wireless communication unit in the first communication network: and 523 indicates connecting the call leg to the active call leg, thereby connecting the on-hold call at the second communication network to the wireless communication unit via the first communication network. If desired this active call leg or corresponding calls can be place on-hold at the first communication network responsive, for example, to receiving a signal from the wireless communication unit directing that the active call leg be placed on hold 525. Thus a process of handing out the on-hold call from the first to the second communication network where it is placed on hold and subsequently handing back in the call results in the on-hold call being on-hold again at the first communication network. Note the processes at 519-525 can be performed transparently to the user of the wireless communication unit.

In this advantageous manner, calls that are on-hold for a communication unit in a first communication network or wireless LAN can be routed to or retrieved and managed by the communication unit when the unit is operating in a second communication network even though the first and second communication networks are only loosely coupled (second network is not aware of the first), concurrent with or after a handover of the communication unit and associated active call from the first to the second communication network. This is in stark contrast to previous practices in similar circumstances where the on-hold calls have been lost to the communication unit through either dropping the on-hold calls or forwarding them to voice mail and thus contributes to increased calling and called party convenience and satisfaction since, for example, the on-hold call will not have to be re-initiated by one of the parties and handling and managing these calls becomes nearly transparent to the particular network that is providing service. It should be noted that the methods and apparatus described above for handling on-hold calls may be implemented with different communication networks than those utilized in the examples above, provided the principles and concepts discussed and disclosed are followed by such networks. In addition, it should be noted that calls that are forwarded to the communication unit in the on-hold state in a first communication network can be routed to or retrieved and managed by the communication unit when the unit is operating in a second communication network, using similar methods.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit for operation within a loosely coupled communication network comprising a first communication network and a second communication network, wherein the first communication network is one of a Wireless Local Area Network and a Wireless Wide Area network and the second communication network is the other of the Wireless Local Area Network and the Wireless Wide Area Network, the wireless communication unit comprising:
   a transceiver to support an air interface with the first communication network and with the second communication network; and
   a controller to control and cooperatively operate with the transceiver to place an active call in the first communication network on hold to provide an on-hold call at the first communication network wherein the on-hold call is created prior to determining that a handout from the first communication network to the second communication network is desired and thereafter retrieve the on-hold call from the first communication network while the wireless communication unit is operating in the second communication network via a call leg in the second communication network established for coupling the on-hold call to the wireless communication unit.

2. The wireless communication unit of claim 1 wherein the controller cooperates with the transceiver in response to determining that the handout from the first communication network to the second communication network is desired and responsive thereto one of i) passively establish the call leg in the second communication network by receiving and connecting to a call with the first communication network via the second communication network, the call corresponding to the on-hold call and ii) proactively establish the call leg in the second communication network by initiating a call and connecting to the call through calling, via the second communication network, a handout number that terminates in the first communication network thereby resulting in the on-hold call being connected to the call.

3. The wireless communication unit of claim 2 wherein the controller distinguishes the call from other calls within the second communication network by comparing call information to expected call information.

4. The wireless communication unit of claim 2 wherein the on-hold call is one of a plurality of on-hold calls made prior to the determining that a handout from the first communication network to the second communication network is desired and wherein, responsive to the on-hold call being one of a plurality of on-hold calls, the controller cooperatively with the transceiver places the call on hold at the second communication network by sending hold information corresponding to the call to the second communication network.

5. The wireless communication unit of claim 4 further comprising a user interface and wherein the establishment of the call leg in the second communication network and the sending hold information corresponding to the call are done automatically and the user interface maintains on-hold information for the on-hold call, the on-hold call now corresponding to the call that is placed on hold at the second communication network.

6. The wireless communication unit of claim 4 wherein the controller cooperatively with the transceiver, after placing the call on hold at the second communication network, facilitates establishment of an other call leg in the second communication network by connecting to an other call with the first communication network via the second communication network that corresponds to an other on-hold call placed on hold at the first communication network and places the other call on hold at the second communication network by sending hold information corresponding to the other call to the second communication network.

7. The wireless communication unit of claim 4 wherein the controller cooperatively with the transceiver, after placing the call on hold at the second communication network, facilitates establishment of an other call leg in the second communication network by connecting to an other call with the first communication network via the second communication network that corresponds to an other active call at the first communication network.

8. The wireless communication unit of claim 4 wherein the controller orders local on-hold call information corresponding to the plurality of on-hold calls in an order for connecting the plurality of on-hold calls to the call, and wherein the controller orders the local on-hold call information according to an on-hold time for each of the plurality of on-hold calls.

9. The wireless communication unit of claim 2 further comprising a user interface and wherein connecting the call is responsive to an indication from the user interface and the user interface provides updated information for the on-hold call corresponding to the call.

10. The wireless communication unit of claim 1 further comprising a user interface wherein the controller cooperates with the transceiver in response to determining that a handout from the first communication network to the second communication network is desired and responsive thereto, automatically and while maintaining the on-hold information for the on-hold call at the user interface:
   establish the call leg in the second communication network by initiating and connecting to a call through calling a number that results in the on-hold call at the first communication network being connected to the call; and
   place the call on hold at the second communication network by sending hold information corresponding to the call to the second communication network.

11. A communication network switch to route calls for a first communication network wherein the first communication network is a Wireless Local Area Network, the communication network switch comprising:
   a switching function to couple the first communication network to a second communication network, wherein the second communication network is a Wireless Wide Area network and where the first communication network and the second communication network are coupled via a public switched network; and
   a controller to control and cooperatively operate with the switching function to place a first active call in the first communication network on hold responsive to a signal from a wireless communication unit to create a first on-hold call in the first communication network, wherein the first on-hold call is created prior to determining that a handout from the first communication network to the second communication network is desired, and thereafter couple, via a call leg in the second communication network, the first on-hold call to the wireless communication unit, the call leg in the second communication network established for coupling the first on-hold call to the wireless communication unit after a handout of the wireless communication unit and while the wireless communication unit is operating in the second communication network.

12. The communication network switch of claim 11 wherein the controller and the switching function in response to determining that a handout from the first communication network to the second communication network is desired is further to one of i) proactively establish the call leg in the second communication network by forwarding, via the second communications network, the first on-hold call to the wireless communication unit and ii) passively establish the call leg in the second communication network by receiving a call that is directed to a handout number from the wireless communication unit via the second communication network and, responsive to receiving the call that is directed to the handout number, connecting a peer call leg in the second communication network of the first on-hold call to the call leg in the second communication network as an active call.

13. The communication network switch of claim 12 wherein the controller cooperatively with the switching function further to hand out a second active call established for the wireless communication unit in the first communication network by establishing a second call leg in the second communication network by forwarding, via the second communications network, the second active call for the wireless communication unit one of i) after the first on-hold call has been forwarded and responsive to the first on-hold call being connected by the wireless communication unit and ii) prior to the first on-hold call being forwarded to the wireless communication unit.

14. The communication network switch of claim 12 wherein the controller cooperatively with the switching function further to hand out a second active call established for the communication unit in the first communication network after the coupling of the on-hold call to the wireless communication unit by establishing an other call leg in the second communication network by receiving an other call that is directed to an other handout number from the wireless communication unit via the second communication network and, responsive to receiving the other call that is directed to the other handout number, connecting the second active call to the other call leg in the second communication network.

15. The communication network switch of claim 12 wherein the first on-hold call is one of a plurality of on-hold calls created in the first communication network prior to the determining that a handout from the first communication network to the second communication network is desired and the controller to order the plurality of on-hold calls according to a predetermined attribute of the respective on-hold calls, thereby insuring that the communication network switch and the wireless communication unit have a common reference for any one of the plurality of on-hold calls.

16. The communication network switch of claim 12 wherein the controller cooperatively with the switching function further to hand out a second on-hold call for the wireless communication unit in the first communication network by establishing a second call leg in the second communication network by forwarding, via the second communications network, the second on-hold call to the wireless communication unit after the first on-hold call has been forwarded.

17. The communication network switch of claim 12 wherein the controller cooperatively with the switching function further to hand out a second on-hold call for the wireless communication unit in the first communication network after the first on-hold call has been connected to the call leg in the second communication network by establishing a second call leg in the second communication network by receiving an other call from the wireless communication unit via the second communication network that is directed to a second handover number and, responsive to receiving the other call, connecting the second on-hold call to the second call leg in the second communication network.

18. The communication network switch of claim 12 wherein, pursuant to connecting the peer call leg of the first on-hold call to the call leg in the second communication network, the controller cooperatively with the switching function and responsive to determining that a handin of the wireless communication unit from the second communication network to the first communication network is desired, establishes an active call leg in the first communication network with the wireless communication unit in the first communication network and connects the peer call leg to the active call leg in the first communication network, thereby connecting the on-hold call to the wireless communication unit via the first communication network.

19. The communication network switch of claim 18 wherein the controller cooperatively with the switching function receives a signal from the wireless communication unit directing that the active call leg be placed on hold, thereby completing a process of handing in the on-hold call from the first to the second communication network where it is placed on hold at the second communication network and subsequently handing back in the first on-hold call resulting in the first on-hold call being on hold again at the first communication network.

20. A method in a communication network switch for routing calls to a wireless communication unit operating in a second communication network, a first and the second communication network comprising a loosely coupled network, wherein the first communication network is a Wireless Local Area Network and the second communication network is a Wireless Wide Area Network, the method comprising:
   placing an active call in the first communication network on-hold responsive to a signal from the wireless communication unit to provide an on-hold call at the first communication network, wherein the on-hold call is created prior to determining, at the wireless communication unit, that a handout from the first communication network to the second communication network is desired for the active call;
   establishing a call leg in the second communication network for coupling the on-hold call from the first communication network to the second communication network after the determining that the handout from the first communication network to the second network is desired; and
   coupling the on-hold call, via the call leg, to the wireless communication unit, while the wireless communication unit is operating in the second communication network.

21. The method of claim 20 further comprising
   i) proactively establishing the call leg in the second communication network by forwarding, via the second communications network, the on-hold call to the wireless communication unit as an active call in the second communication network; and
   ii) passively establishing the call leg in the second communication network by receiving a call from the wireless communication unit via the second communication network that is directed to a handout number and, responsive to receiving the call that is directed to the handout number, connecting the peer leg of the on-hold call to the call leg as an active call.

22. The method of claim 21 further comprising handing out an other active call created in the first communication network for the wireless communication unit by establishing an other call leg by forwarding, via the second communications network, the other active call to the wireless communication unit, one of i) after the on-hold call has been forwarded and responsive to the on-hold call being connected by the wireless communication unit and ii) prior to the on-hold call being forwarded to the wireless communication unit.

23. The method of claim 21 further comprising handing out a second active call in the first communication network for the wireless communication unit after the coupling of the on-hold call, via the call leg, to the wireless communication unit by establishing a second call leg by receiving a third call from the wireless communication unit via the second communication network that is directed to a second handout number and, responsive to receiving the third call, connecting the second active call to the second call leg.

24. The method of claim 21 wherein the on-hold call is one of a plurality of on-hold calls created in the first communication network prior to determining that the handout from the first communication network to the second communication network is desired and the method further comprises ordering the plurality of on-hold calls at the communication network switch and at the wireless communication unit according to a common predetermined attribute of the respective on-hold calls, thereby ensuring that the communication network switch and the wireless communication unit have a common reference for any one of the plurality of on-hold calls.

25. The method of claim 24 further comprising handing out a second on-hold call for the wireless communication unit at the first communication network by establishing an a second call leg in the second communication network by forwarding, via the second communications network, the second on-hold call to the wireless communication unit after the on-hold call has been coupled to the wireless communication unit.

26. The method of claim 24 further comprising handing out a second on-hold call for the wireless communication unit after the on-hold call has been connected to the call leg and thus to the wireless communication unit by establishing a second call leg in the second communication network by receiving an other call from the wireless communication unit via the second communication network that is directed to a second handout number and, responsive to receiving the other call, connecting the second on-hold call to the other call leg.

27. The method of claim 20 pursuant to coupling the on-hold call to the wireless communication unit via the call leg further comprising:

determining that a handin of the call from the second communication network to the first communication network is desired; and establishing, responsive to the determining that the handin is desired, an other active call leg in the first communication network with the wireless communication unit: and coupling the on-hold call, via the other active call leg, to the wireless communication unit, while the wireless communication unit is operating in the first communication network.

28. The method of claim 27 further comprising:

receiving a signal from the wireless communication unit directing that the other active call leg be placed on hold, thereby completing a process of handing out the on-hold call from the first communication network to the second communication network where it is placed on hold and subsequently handing back in the call resulting in the on-hold call being on hold again at the first communication network.

* * * * *